July 29, 1969 N. C. LOCATI 3,457,970
SELF-TENSIONING CHAIN DEVICES
Filed Nov. 9, 1966 2 Sheets-Sheet 1
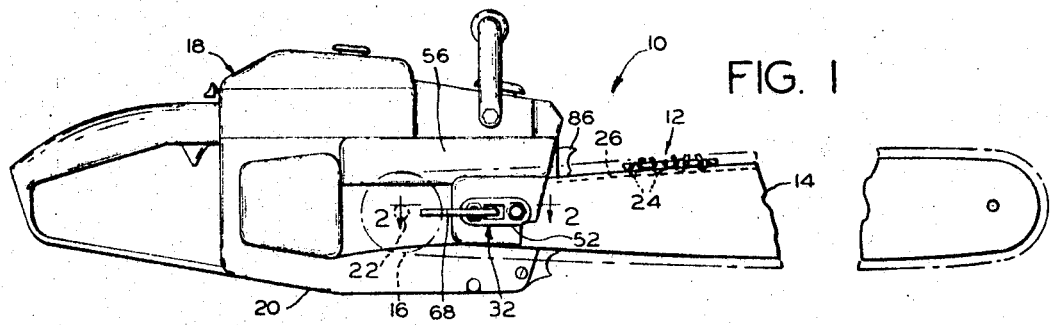
FIG. 1
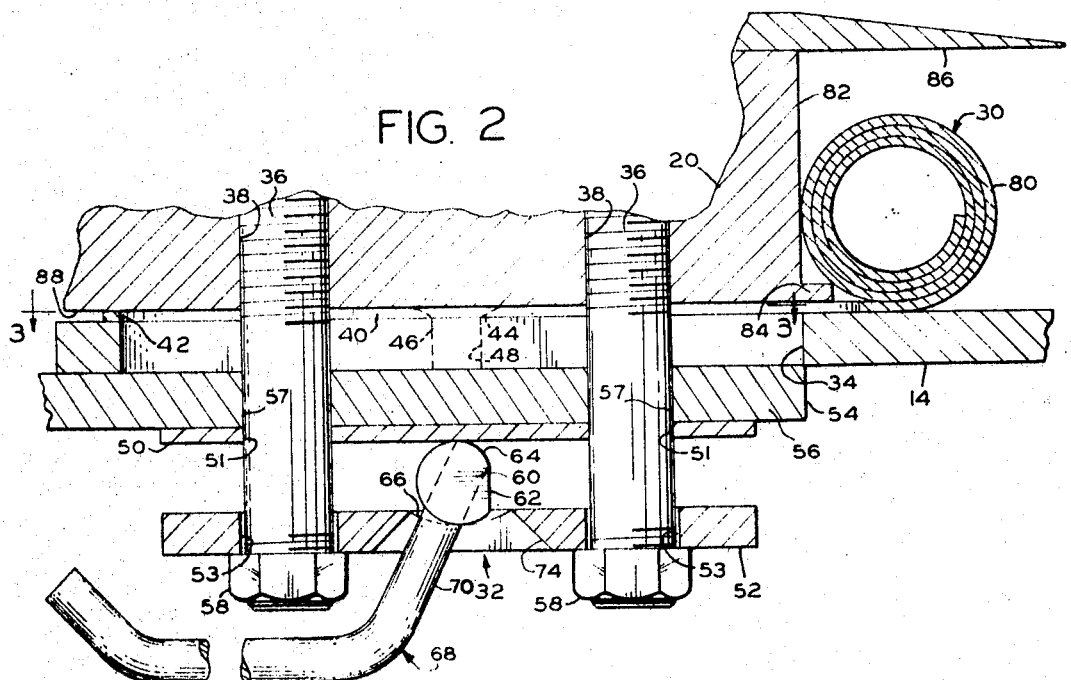
FIG. 2
FIG. 3
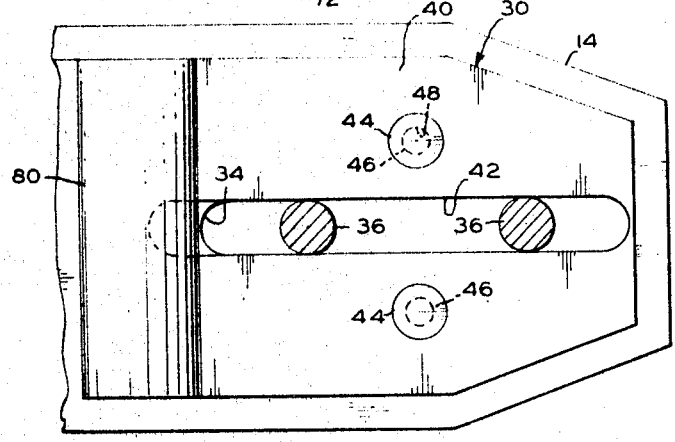
NORMAN C. LOCATI
INVENTOR
BY
BUCKHORN, BLORE, KLARQUIST & SPARKMAN
ATTORNEYS

United States Patent Office 3,457,970
Patented July 29, 1969

3,457,970
SELF-TENSIONING CHAIN DEVICES
Norman C. Locati, Lake Oswego, Oreg., assignor to Omark Industries, Inc., Portland, Oreg., a corporation of Oregon
Filed Nov. 9, 1966, Ser. No. 593,033
Int. Cl. B27b 17/14
U.S. Cl. 143—32                                  9 Claims

ABSTRACT OF THE DISCLOSURE

Saw bars are mounted slidably on chain saw engine castings clamped by quickly operable clamps after being urged by constant force coiled springs to positions placing saw chains under desired tensions.

DESCRIPTION

This invention relates to self-tensioning chain devices, and more particularly to chain saws including chain tensioning mechanisms.

Chain saws of the type most extensively used each includes a saw bar adjustably secured by an adjusting mechanism to an engine casting and an endless saw chain entrained around the saw bar and a drive sprocket journaled on the engine casting and driven by the engine. The adjusting mechanism is provided to adjust the saw bar relative to the sprocket to take out slack in the chain, and two types of adjusting mechanisms have been known hitherto. In one of these types the saw bar is clamped rigidly to the frame except when an adjustment is to be made, which must be done while the drive of the saw chain is stopped. This type has the disadvantages of necessitating stopping the drive and of being difficult to make the adjustment to consistently provide the desired chain tension and also of not being adjustable while the chain is at its heated, operating temperature. In the other type of adjusting mechanism the saw bar is always freely movable away from the drive sprocket, and a coil spring continuously urges the saw bar away from the drive sprocket. This normally places a tensioning force within the desired range on the saw chain, but as the chain changes in length either from heating or wear at the rivet holes of the links, the spring elongates and places less force on the saw bar. Also, when the saw bar is subjected to a longitudinal force, as occurs during "stabbing" or "boring" operation of the chain saw, the saw bar is pushed back toward the drive sprocket, which creates undesired slack in the chain. It would be desirable to provide an adjustment mechanism which may be actuated to tighten the saw chain while the saw chain is driven, which also rigidly locks the saw bar to the engine casting and which always tightens the saw chain with a constant tensioning force.

An object of the invention is to provide new and improved self-tensioning chain devices.

Another object of the invention is to provide chain saws having new and improved chain tensioning mechanisms.

A further object of the invention is to provide adjustment mechanisms for tensioning saw chains which can be actuated while the saw chains are driven so that the saw chains are at their heated, operating temperatures.

Another object of the invention is to provide adjustment mechanisms for tensioning saw chains in which adjustment of saw bars is effected by springs and which, after the adjustments have been made, rigidly lock the saw bars against movement relative to sprockets driving the saw chains.

A still further object of the invention is to provide adjustment mechanisms adapted, when actuated, to always apply a uniform saw chain tensioning force to saw bars on which the saw chains are mounted.

The invention provides a chain tensioning mechanism in which a spring determines the tension on the chain. Preferably the spring is a constant force coiled spring giving a constant tension regardless of the condition of adjustment. There also is preferably provided a clamp which rigidly holds a chain guiding member against movement relative to a guiding sprocket until the clamp is is released to permit the spring to move the chain guiding member to tension the chain, after which the clamp is again actuated to rigidly hold the chain guiding member. A chain saw forming one specific embodiment of the invention includes an engine casting mounting a drive sprocket on a fixed axis of rotation, and a saw bar mounting a saw chain with the drive sprocket is mounted slidably on the engine casting and is urged with a constantly uniform force in a chain tensioning direction by a constant force coiled spring bearing against the engine casting and the saw bar. A manually releasable clamp positioned outside a cover of the chain saw is manually operated between a release position releasing the saw bar for movement by the spring and a clamp position locking the saw bar rigidly to the engine casting. The clamp may be momentarily released while the saw is running and the chain is at its heated, operating temperature. This permits the spring to move the bar to a position applying a predetermined tension to the spring, after which the clamp is actuated to again clamp the bar to the engine casting.

A complete understanding of the invention may be obtained from the following detailed description of chain tensioning devices forming specific embodiments thereof, when read in conjunction with the appended drawings, in which:

FIG. 1 is a fragmentary side elevation view of a chain saw including a self-tensioning chain device forming one embodiment of the invention;

FIG. 2 is an enlarged horizontal sectional view taken along line 2—2 of FIG. 1;

FIG. 3 is an enlarged vertical sectional view taken along line 3—3 of FIG. 2;

Figure 4:
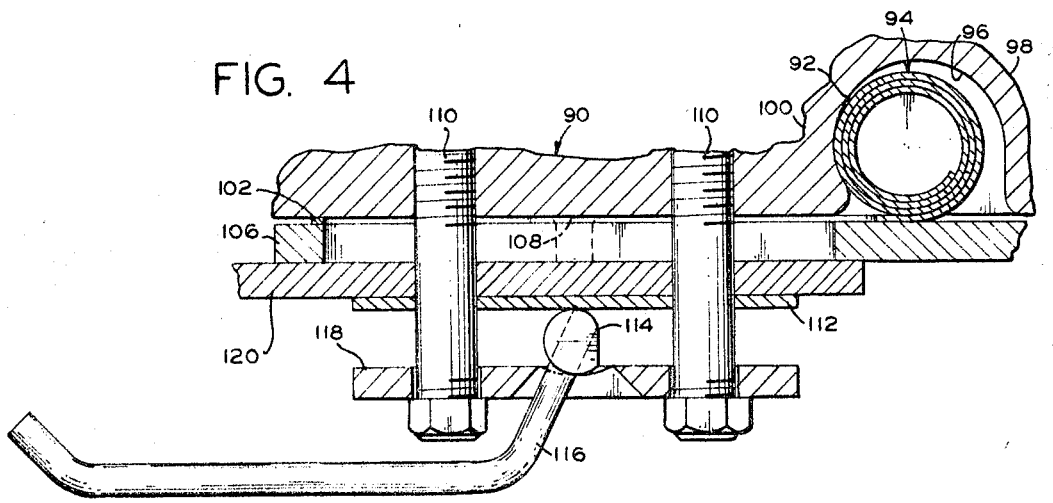
FIGS. 4 and 5 are horizontal sectional views of chain saws including self-tensioning chain devices forming alternate embodiments of the invention.

Referring now in detail to the drawings, a chain saw 10 forming one embodiment of the invention includes a saw chain 12 entrained on a saw bar 14 and a drive sprocket 16 driven through a centrifugal clutch mechanism (not shown) by an engine 18 including an engine casting 20, which forms the main frame of the chain saw, a shaft 22 of the drive sprocket being journaled in the casting 20 on a fixed axis of rotation. The saw chain has drive links 24 which travel along a groove 26 in the edge of the saw bar.

To provide a desired uniform tension on the saw chain 12, the saw bar 14 is urged toward the right, as viewed in FIGS. 1 and 2, relative to the casting 20 by a constant force coiled spring 30, which may be a spring of this type sold under the trademark "Neg'ator," whenever a clamping mechanism 32 is released, and, after the saw bar has fully tensioned the saw chain, the clamping mechanism is manually actuated to reclamp the saw bar rigidly to the casting 20. The saw bar and the drive sprocket then hold the saw chain under a precise desired tension. The saw bar has a longitudinal mounting slot 34 (FIGS. 2 and 3) fitted closely and slidably on mounting studs 36 screwed into tapped bores 38 in the engine casting 20. A short, flat shank portion 40 of the negator spring 30 has a longitudinal slot 42 registering with the slot 34 in the saw bar when connecting pins 44 secured to the shank portion 40 by flush rivet portions 46 are inserted into bores 48 in the saw bar to assemble the spring and the saw bar. The spring preferably is of 301 stainless steel and has a uniformly constant tension force, when uncoiled to any extent, preferably in the range of from thirty pounds to thirty-five pounds.

A hardened clamping or wear plate or shoe 50 having bores 51, a cam plate 52 having bores 53 and a recessed mounting portion 54 of a cast metal guard cover 56 having bores 57 are slidable along the studs 36, and are retained thereon by lock nuts 58 screwed onto the outer ends of the studs. A clamp 60 preferably of hardened tool steel is cylindrical except for a relieved flat 62 and a rounded portion 64 blending the cylindrical periphery to the flat 62. The clamp seats rotatably in a shallow groove 66 in the plate 52 and bears against the clamping plate 50. An actuating rod 68 has a shank 70 rigidly secured to the clamp 60 and a handle 72 in the form of a shallow loop positioned exteriorly of the plate 52 so that it may be safely grasped and actuated while the saw is running. The shank 70 extends through a clearance slot 74 in the cam plate 52.

A coil 80 (FIG. 2) of the spring 30 bears against front face 82 of the casting 20, and a projection 84 on the casting forms with the face 82 and a dog 86 a shallow retaining groove or socket for the coil 80, the entire spring being supported and held in position by the shank portion 40 thereof on the studs 36. The flat shank portion 40 of the spring 30 extends from the lefthand end of the spring, as viewed in FIG. 2, only to a point part way along the slot 42, all the rest of the spring tending always to wind itself into the coil 80 with a uniformly constant force throughout the entire possible range of movement of the saw bar 14 relative to the casting 20.

During operation of the chain saw, the clamp 60 is wedged against the plate 50 and the shank portion 40 of the spring 30 and the saw bar 14 are rigidly clamped between the portion 54 of the cover 56 and adjacent face 88 of the casting 20, the handle 72 lying closely along the plate 52. Whenever it is desired to tighten the chain, the handle 72 is grasped, and the actuating rod 68 is swung counterclockwise, as viewed in FIG. 2. This turns the clamp 60 counterclockwise until the flat 62 faces the plate 50. This releases the plate 50 and guard cover, and the spring 30 pulls the saw bar 14 to the right with a constant, uniform tension to tension the saw chain 12. This occurs instantly, and the handle 72 then is swung back to rigidly lock the saw bar in the adjusted position. Thus, all the user needs to do to precisely tension the chain is to swing the handle to its releasing position and then swing it back to its clamping position.

Embodiment of FIG. 4

A chain saw 90 includes a self-tensioning chain device forming an alternate embodiment of the invention and similar to that of the chain saw 10 except that, in the chain saw 90, a coil 92 of a constant force coiled spring 94 is positioned in a recess or socket 96 of a plate portion 98 of a main engine casting 100 and a flat shank portion 102 of the spring is somewhat shorter than the flat shank portion 40. The shank portion 102 and a saw bar 106 are connected together by pins 108 and are mounted for longitudinal movement on studs 110. A clamping plate 112 on the studs is forced against the saw bar by a clamp 114 operable by an actuating rod 116. The plate 112, a plate 118 and a guard cover 120 are mounted for sliding movement along the studs 110. The actuating rod may be swung counterclockwise to release the saw bar and spring and permit the spring to urge the saw bar to the right to tension the saw chain, after which the actuating rod is swung back to its clamping position to rigidly clamp the saw bar to the engine casting.

Figure 5:
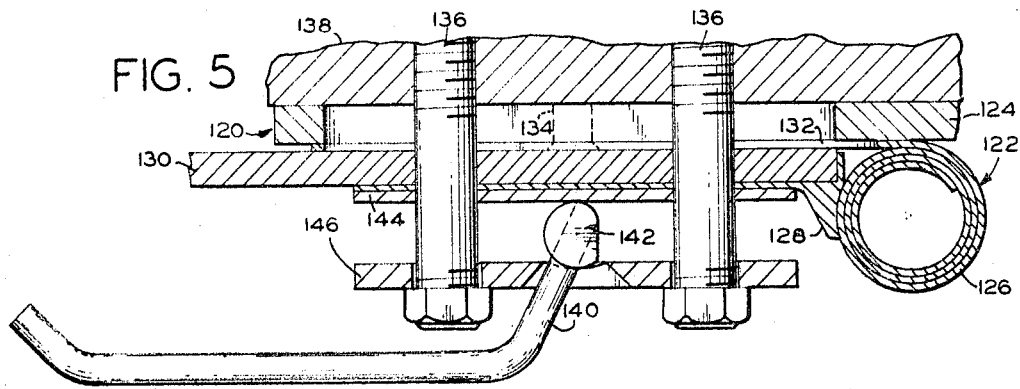

Embodiment of FIG. 5

A chain saw 120 includes a self-tensioning chain device forming an alternate embodiment of the invention and similar to that of the chain saw 10 except that a constant force coiled spring 122 is mounted on the opposite side of a saw bar 124 from that on which the spring 30 is mounted on the saw bar 14. A coil 126 of the spring 122 abuts an adapter plate 128 secured rigidly to guard cover 130. A slotted shank portion 132 of the spring is secured by pins 134 to the saw bar and is mounted with the saw bar by studs 136 for sliding movement along an engine casting 138 of the chain saw when an actuating rod 140 moves a clamp 142 to its release position freeing a clamping plate 144. A grooved plate 146 mounts the clamp 142 rotatably.

Figure 6:
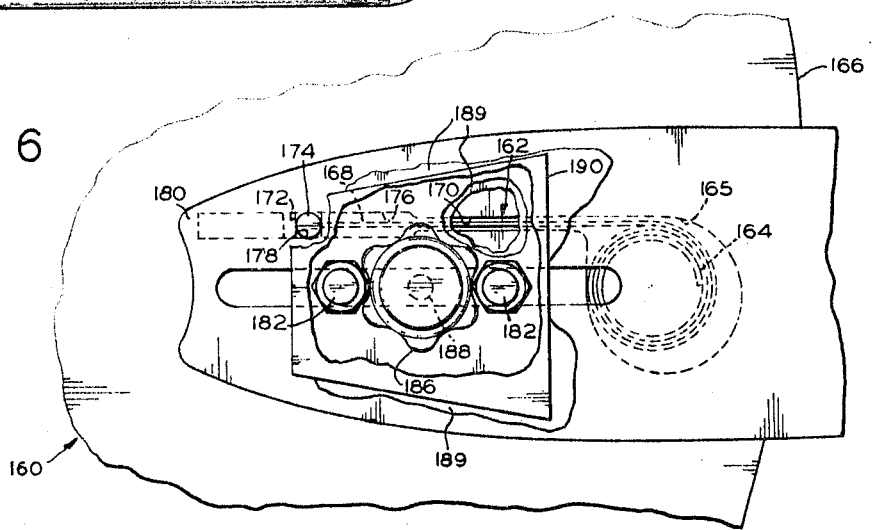
FIG. 6 is a fragmentary side elevation view of a chain saw including a self-tensioning chain device forming an alternate embodiment of the invention.

Embodiment of FIG. 6

A chain saw 160 includes a self-tensioning chain device forming an alternate embodiment of the invention and generally similar to that of FIG. 1 except for the arrangement of a constant force coiled spring 162. A coil 164 of the spring 162 is positioned in a socket 165 in a main engine casting 166 of the chain saw, and end portion 168 of the spring extends through a groove 170 in the casting and is secured to a slide 172 attached to a connector pin or dog 174 and slidable along guideway 176 in the engine casting. The connector pin projects into a hole 178 in a slotted saw bar 180 slidable lengthwise on pins 182 carried by the engine casting. A hand nut 186 is screwed on a stud 188 on the engine casting to normally press through a clamping plate 190 a guard cover 189 against the saw bar to clamp the saw bar rigidly between the plate 190 and the engine casting. To tension the saw chain on the saw bar 180 and the drive sprocket, the nut 186 is loosened to permit the spring 162 to move the saw bar to the right, and then the nut is retightened to rigidly clamp the saw bar to the engine casting, the chain then being held indefinitely under the desired tension.

Each of the above-described self-tightening chain devices is operable in a matter of seconds to remove slack from and place the proper tension on the saw chain and to reclamp the saw bar to the engine casting to maintain the saw chain with that tension. The devices are operable without stopping the chain saw and hold the saw bar rigid for bucking and stabbing as well as for cross cutting and ripping operations.

What is claimed is:
1. In combination,
    frame means,
    a sprocket mounted on the frame means on a fixed axis of rotation,
    chain guide means,
    means mounting the chain guide means movably on the frame means,
    a chain extending around the sprocket and the chain guide means,
    and constant force coiled spring means bearing on the frame means and the guide means and urging the guide means away from the sprocket with a uniform force.
2. In combination,
    frame means,
    a sprocket mounted on the frame means on a fixed axis of rotation,
    chain guide means,
    means mounting the chain guide means for longitudinal movement thereof on the frame means,
    a chain on the chain guide means and the sprocket,
    spring means bearing between the chain guide means and the frame means and urging the chain guide means in a direction tensioning the chain,
    and quick-release, cam actuated, wedging means for locking the chain guide means to the frame means to prevent movement of the chain guide means in a direction such as to loosen the chain.

3. In a chain saw,
a main frame,
a drive sprocket journaled on the main frame,
a saw bar,
means mounting the saw bar slidably on the main frame for longitudinal movement of the saw bar,
a saw chain mounted on the drive sprocket and the saw bar,
spring means between the frame and the saw bar and acting to urge the saw bar away from the sprocket to tension the saw chain,
clamping means for holding the saw bar against movement relative to the frame in a direction such as to loosen the saw chain,
a cam positioned between the clamping plate member and the clamping means for wedging the clamping means against the saw bar,
and manually operable lever means for actuating the cam.

4. In a chain saw,
a main frame,
a drive sprocket journaled on the main frame,
a saw bar,
means mounting the saw bar slidably on the main frame for longitudinal movement of the saw bar,
a saw chain mounted on the drive sprocket and the saw bar,
spring means between the frame and the saw bar and acting to urge the saw bar away from the sprocket to tension the saw chain,
and locking means for holding the saw bar against movement relative to the frame in a direction such as to loosen the saw chain and comprising manually operable clamp means for rigidly clamping the saw bar to the frame,
the clamp means comprising a guard cover engaging the saw bar, a clamping plate and a cam positioned between and adapted to be wedged between the guard cover and the clamping plate and adapted to clamp the saw bar between the frame and the guard cover.

5. In a chain saw,
a main frame,
a drive sprocket journaled on the main frame,
a saw bar,
means mounting the saw bar slidably on the main frame for longitudinal movement of the saw bar,
a saw chain mounted on the drive sprocket and the saw bar,
spring means between the frame and the saw bar and acting to urge the saw bar away from the sprocket to tension the saw chain,
the spring means including a constant force coiled spring having a coil bearing on the frame and connector means connecting the spring to the saw bar,
and locking means for holding the saw bar against movement relative to the frame in a direction such as to loosen the saw chain.

6. The chain saw of claim 5 wherein the coil of the spring bears against the front end of the frame,
the mounting means including a pair of studs projecting through slots in the saw bar and a shank portion of the spring.

7. The chain saw of claim 5 wherein the frame has a recess therein receiving the coil of the spring.

8. The chain saw of claim 5 including a guard cover means positioned on the opposite side of the saw bar from the main frame and carried by the main frame,
the coil of the spring bearing against the front end of the guard cover means and the spring having an end portion secured to the saw bar and positioned between the guard cover and the saw bar.

9. The chain saw of claim 5 wherein the frame includes a face against which the saw bar may be clamped and also has a socket adjacent the face receiving the coil of the spring and a slot extending along the saw bar and serving to guide an end portion of the spring,
the connector means including a pin secured to the end of the spring and to the saw bar.

References Cited
UNITED STATES PATENTS

| | | |
|---|---|---|
| 1,977,546 | 10/1934 | Fornelius. |
| 3,144,775 | 8/1964 | Chaimson. |
| 3,279,508 | 10/1966 | Ehlen et al. _____ 143—32 |

DONALD R. SCHRAN, Primary Examiner

U.S. Cl. X.R.
267—1